United States Patent
Roldan Gonzalez et al.

(10) Patent No.: US 10,189,413 B2
(45) Date of Patent: Jan. 29, 2019

(54) ADJUSTABLE TAMBOUR CARGO DECK FOR A VEHICLE

(71) Applicant: GM GLOBAL TECHNOLOGY OPERATIONS LLC, Detroit, MI (US)

(72) Inventors: Oscar Manuel Roldan Gonzalez, Tulancingo (MX); Cesar Cervantes Sandoval, Tlalnepantla (MX); Bruce L. Stone, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 13 days.

(21) Appl. No.: 15/610,212

(22) Filed: May 31, 2017

(65) Prior Publication Data

US 2018/0345869 A1 Dec. 6, 2018

(51) Int. Cl.
*B60R 7/04* (2006.01)
*B60R 5/04* (2006.01)
*B62D 43/06* (2006.01)

(52) U.S. Cl.
CPC .............. *B60R 5/047* (2013.01); *B62D 43/06* (2013.01)

(58) Field of Classification Search
CPC ..... B64C 1/20; B64C 2001/0027; B64D 9/00; B64D 11/00; Y02T 50/46; B60P 1/00; B61D 3/04; B63B 21/507; B63B 2003/147; B63B 27/04
USPC .............. 296/37.14, 26.01, 37.16; 244/137.1
See application file for complete search history.

(56) References Cited

U.S. PATENT DOCUMENTS

| | | | | |
|---|---|---|---|---|
| 4,305,695 A * | 12/1981 | Zachrich | ................... | B60P 1/00 296/37.1 |
| 4,681,360 A * | 7/1987 | Peters | ....................... | B60P 1/00 296/37.6 |
| 4,824,158 A * | 4/1989 | Peters | ....................... | B60R 5/04 108/44 |
| 5,513,941 A * | 5/1996 | Kulas | ...................... | B60P 1/003 211/151 |
| 5,634,408 A * | 6/1997 | Jarkowski | ............... | B60P 1/003 108/44 |
| 5,649,731 A * | 7/1997 | Tognetti | .................. | B60P 1/003 296/26.09 |
| 5,944,371 A * | 8/1999 | Steiner | ...................... | B60R 5/04 296/187.11 |
| 6,120,075 A * | 9/2000 | Terry | ...................... | B60P 1/003 224/403 |

(Continued)

*Primary Examiner* — Kiran B Patel
(74) *Attorney, Agent, or Firm* — Lorenz & Kopf, LLP (57) ABSTRACT

Methods and apparatus are provided for adjusting the cargo area of a vehicle. The apparatus comprises a support structure having a track system. The track system includes a first track portion defining a first cargo floor position, a second track portion defining a second cargo floor position and a third track portion defining a cargo floor storage position. A tambour cargo deck is supported by the track system, and movable from the first or second cargo floor position to the cargo floor storage position, and movable from the cargo floor storage position to the first or second cargo floor position. In this way, the cargo area can be increased or decreased as desired. The method comprises sliding the tambour cargo deck from the first cargo floor position to the storage position and sliding the tambour cargo deck from the storage position to the second cargo floor position.

9 Claims, 6 Drawing Sheets

(56) References Cited

U.S. PATENT DOCUMENTS

| | | | | |
|---|---|---|---|---|
| 6,244,646 | B1* | 6/2001 | Wheeler, III | B60P 3/14 |
| | | | | 296/26.01 |
| 6,398,283 | B1* | 6/2002 | Knudtson | B60P 1/003 |
| | | | | 296/26.09 |
| 6,585,306 | B1* | 7/2003 | Smith | B60P 1/00 |
| | | | | 296/24.44 |
| 6,659,524 | B1* | 12/2003 | Carlson | B60P 1/003 |
| | | | | 296/26.09 |
| 6,758,508 | B2* | 7/2004 | Weyhrich | B62D 33/02 |
| | | | | 296/100.18 |
| 7,494,170 | B2 | 2/2009 | Hanzel et al. | |
| 8,540,297 | B2 | 9/2013 | Browne et al. | |
| 9,669,773 | B2* | 6/2017 | Hanley | A47B 81/00 |
| 2002/0109368 | A1* | 8/2002 | Mink | B60P 1/003 |
| | | | | 296/26.13 |
| 2002/0140245 | A1* | 10/2002 | Coleman, II | B60P 1/003 |
| | | | | 296/26.09 |
| 2002/0153736 | A1* | 10/2002 | Goodyear | B60P 1/003 |
| | | | | 296/26.01 |
| 2002/0180231 | A1* | 12/2002 | Fox | B60P 3/40 |
| | | | | 296/26.01 |
| 2006/0180623 | A1* | 8/2006 | Reynolds | B60R 5/04 |
| | | | | 224/542 |
| 2014/0097634 | A1* | 4/2014 | Jones | B60R 5/04 |
| | | | | 296/10 |
| 2014/0265411 | A1* | 9/2014 | Thota | B60R 5/04 |
| | | | | 296/37.16 |
| 2018/0154836 | A1* | 6/2018 | Herman | B60P 7/04 |

* cited by examiner

ADJUSTABLE TAMBOUR CARGO DECK FOR A VEHICLE

INTRODUCTION

The present invention generally relates to vehicle cargo areas, and more particularly relates to an adjustable tambour cargo deck for adjusting the volume of the cargo area.

Many sport-utility vehicles, mini vans and crossover vehicles provide a rear cargo area for storing items of the operator or passengers of the vehicle. While the rear cargo area is a popular feature of such vehicles, the cargo floor (and hence the available cargo area) is fixed by each manufacturers design and placement of the cargo floor in the vehicle.

Accordingly, it is desirable to be able to adjust the volume of the cargo area of a vehicle. In addition, it is desirable to utilize a tambour cargo deck that can be readily moved between one of two (or several cargo floor positions as desired. Furthermore, other desirable features and characteristics of the present disclosure will become apparent from the subsequent detailed description of the disclosure and the appended claims, taken in conjunction with the accompanying drawings and the background of the disclosure.

SUMMARY

An apparatus is provided for adjusting the cargo area of a vehicle. The apparatus includes a support structure having a track system. The track system includes a first track portion defining a first cargo floor position, a second track portion defining a second cargo floor position and a third track portion defining a third cargo floor position. A tambour cargo deck is supported by the track system, and movable from the first or second cargo floor position to the third cargo floor position, and movable from the third cargo floor position to the first or second cargo floor position. In this way, the cargo area can be increased or decreased as desired.

In another aspect of the disclosure, the support system is molded into interior cargo area trim panels of a vehicle.

In another aspect of the disclosure, the tambour cargo deck includes a plurality of ribs supported by a scrim.

In another aspect of the disclosure, the plurality of ribs are made from a composite material.

In another aspect of the disclosure, the composite material is a para-aramid synthetic fiber.

In another aspect of the disclosure, the plurality of ribs are made from a metal material.

In another aspect of the disclosure, the metal material is either aluminum, titanium, steel or an alloy thereof.

In another aspect of the disclosure, the tambour cargo deck includes a handle for facilitating movement of the tambour cargo deck along the track system.

A vehicle is provided having an adjustable cargo area. The vehicle includes interior panels positioned within the cargo area that have a track system with a first track portion defining a first cargo floor position, a second track portion defining a second cargo floor position and a third track portion defining a third cargo floor position. A tambour cargo deck is supported by the track system, and slidably movable from the first or second cargo floor position to the third cargo floor position, and slidably movable from the third cargo floor position to the first or second cargo floor position.

In another aspect of the disclosure, a spare tire for the vehicle is accessible when the tambour cargo deck is in the third cargo floor position.

In another aspect of the disclosure, the tambour cargo deck includes a plurality of ribs supported by a scrim.

In another aspect of the disclosure, the plurality of ribs are made of a composite material.

In another aspect of the disclosure, the composite material is a para-aramid synthetic fiber.

In another aspect of the disclosure, the plurality of ribs are made from a metal material.

In another aspect of the disclosure, the metal material is either aluminum, titanium, steel or an alloy thereof.

In another aspect of the disclosure, the tambour cargo deck includes a handle for facilitating movement of the tambour cargo deck along the track system.

In another aspect of the disclosure, the cargo area of the vehicle is increased when the tambour cargo deck is moved from the first cargo floor storage position to the second cargo floor storage position.

A method is provided for adjusting a tambour cargo deck within a cargo area of a vehicle having interior panels positioned within the cargo area with a track system molded therein having a first track portion defining a first cargo floor position, a second track portion defining a second cargo floor position and a third track portion defining a third cargo floor position. The method includes sliding the tambour cargo deck from the first cargo floor position to the storage position and sliding the tambour cargo deck from the third cargo floor position to the second cargo floor position.

In another aspect of the disclosure, the tambour cargo deck is movable from the second cargo floor position to the third cargo floor position and then from the third cargo floor position to the first cargo floor position.

In another aspect of the disclosure, sliding the tambour cargo deck from either the first or second cargo floor position to the third cargo floor position provides access to a spare tire storage area of the vehicle.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the disclosure or the application and uses of the disclosure. Furthermore, there is no intention to be bound by any theory presented in the preceding background or the following detailed description.

An adjustable cargo area for a vehicle is provided by the present disclosure. The cargo area includes a support structure having a track system. The track system includes a first track portion defining a first cargo floor position, a second track portion defining a second cargo floor position and a third track portion defining a third cargo floor position. A tambour cargo deck is supported by the track system, and slidably movable from the first or second cargo floor position to the cargo floor storage position, and slidably movable from the third cargo floor position to the first or second cargo floor position. In this way, the cargo area can be increased or decreased as desired.

Referring to FIGS. 1-6, will facilitate those skilled in the art in understanding the adjustable cargo area for a vehicle provided by the present disclosure. The vehicle 100 includes a cargo area 102 that is defined by a rear passenger seat 104, interior side trim panels 106, a cargo floor 108 and a vehicle ceiling (not shown). In fundamental embodiments of the present disclosure, the cargo floor 108 comprises a tambour cargo deck that is slidably movable between a first (upper) cargo floor position and a second (lower) cargo floor position. As used herein, "tambour" means a flexible panel comprising ribs or slats that are pivotably articulated to one another via a scrim that binds the individual ribs or slats together. In exemplary embodiments, a strap or handle 110 is provided to facilitate the adjustment of the tambour cargo deck. In other embodiments, additional or alternate straps or handles 110 may be placed on either side of the tambour cargo deck 108 to facilitate operation by both left-handed and right-handed operators. As will be appreciated, lowering the tambour cargo deck 108 to the second cargo for position will increase the overall volume of the cargo area 102.

Figure 5:
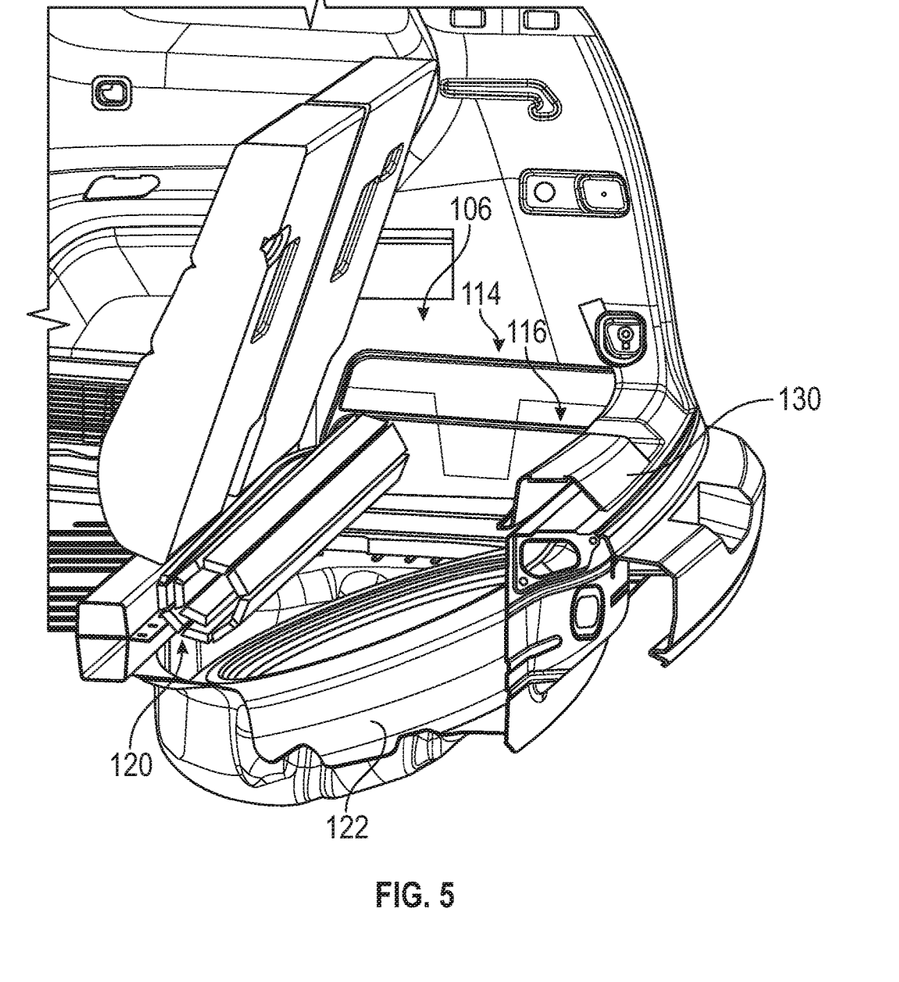
FIG. 5 is a cutaway side view illustrating the tambour cargo deck in a third (stored) position in accordance with an embodiment.

The tambour cargo deck 108 is slidably movable along a track system (best seen in FIG. 6) that includes a first track portion 114 that defines a first (upper) cargo floor position, a second track portion 116 that defines a second (lower) cargo floor position and a third track portion 118 that defines a third (storage) cargo floor position for the tambour cargo deck 108. In some embodiments, the third track portion has a generally spiral shaped causing the tambour cargo deck to coil or rollup into the storage position as illustrated in FIG. 5. The cargo floor storage position defined by the third track portion 118 also operates as an intermediate position as the tambour cargo deck 108 moves between the first cargo floor position and the second cargo floor position. That is, an operator would manually move (slidably push) the tambour cargo deck 108 from either the first cargo floor position or the second cargo position into the third (storage) cargo floor position, and then manually retract (slidably pull) the tambour cargo deck into either the first cargo floor position or the second cargo floor position as desired to increase or decrease the available cargo area. It will be appreciated that additional track sections could be implemented in any particular realization to offer additional levels of cargo area volume adjustment by offering more cargo floor positions.

In some embodiments, a spare tire area 120 positioning a spare tire 122 for the vehicle is assessable when the tambour cargo deck is in the third (stored) cargo floor position as illustrated in FIG. 5. As will be appreciated, in those embodiments that do not store a spare tire for the vehicle below the cargo area a second fixed cargo floor area may be provided to provide further adjustments to the volume of the cargo area by placing the tambour cargo deck in the stored position.

Figure 6:
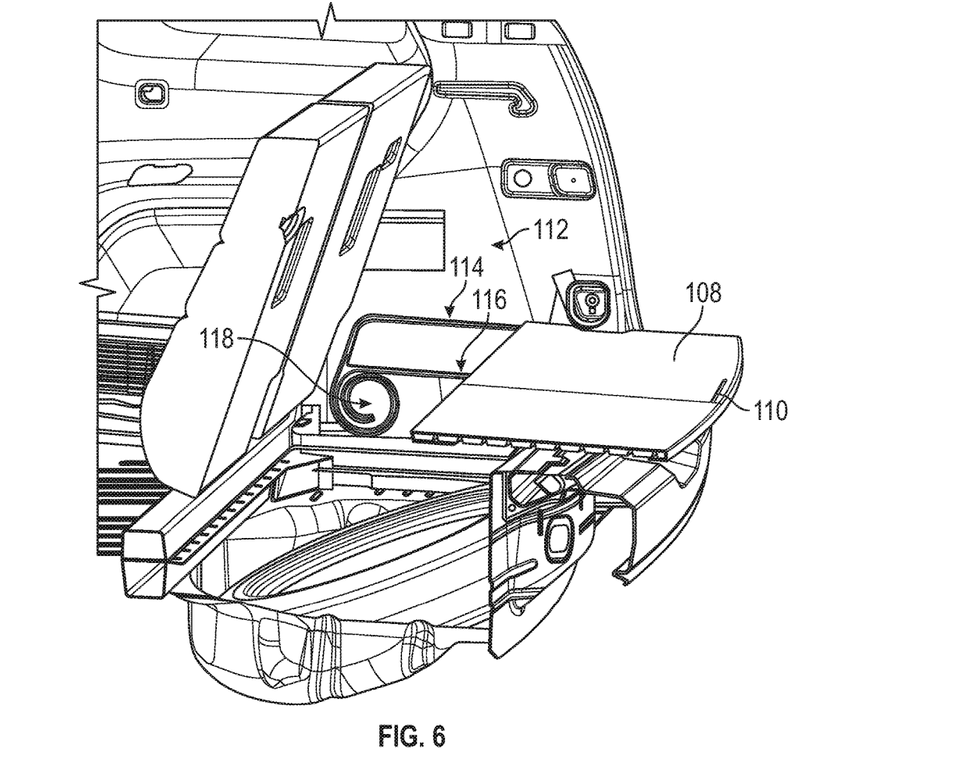
FIG. 6 is a cutaway side view illustrating the installation of the tambour cargo deck in the vehicle in accordance with an embodiment.

FIG. 6 also illustrates an exemplary installation method for the tambour cargo deck 108 into the track system 112. In some embodiments, the track system 112 is molded into interior side trim panels 106. Prior to installation of a decorative sill plate 130 (see FIG. 5) the tambour cargo deck 108 can be freely slid into the first track portion 114 and then the decorative sill plate 130 is installed to captivate the tambour cargo deck 108 for operation.

Figure 7:
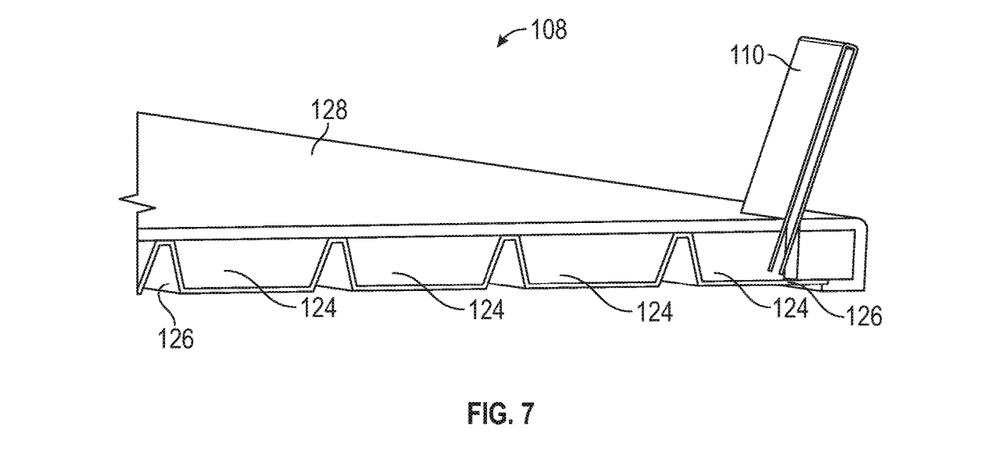
FIG. 7 is a perspective side view of the tambour cargo deck in accordance with an embodiment.
Figure 8A:
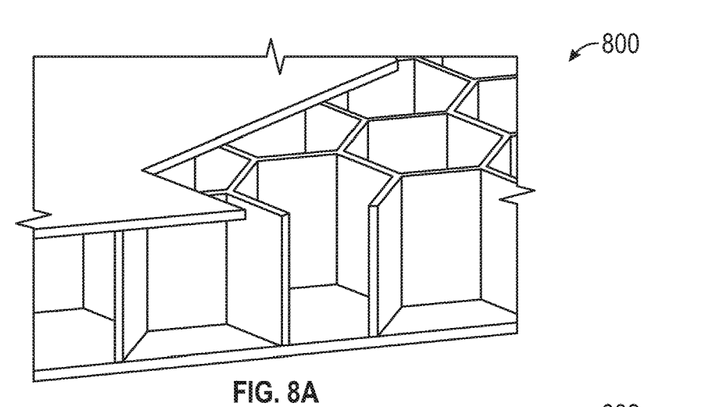
FIGS. 8A-8C our perspective cutaway views of honeycomb panels suitable for use in the tambour cargo deck of FIG. 7 in accordance with an embodiment.
Figure 8B:
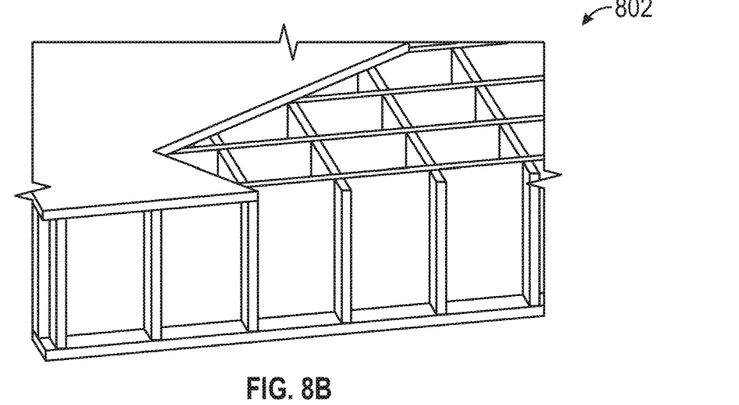
Figure 8C:
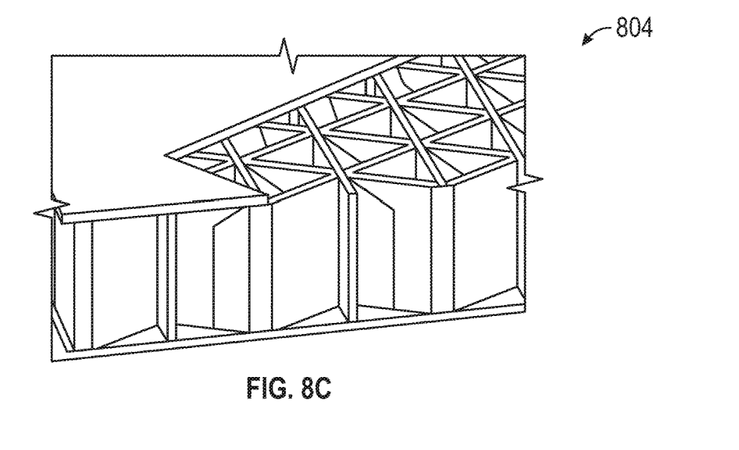

FIG. 7 illustrates a side perspective view of the tambour cargo deck 108. As noted above, as used herein, "tambour" means a flexible panel comprising ribs or slats that are pivotably articulated to one another via a scrim that binds the individual ribs or slats together. As illustrated in FIG. 7 the tambour cargo deck 108 includes a plurality of ribs 124 that are bound together by a scrim 126 and overlain by a fabric or carpet 128 that may provide a decorative outer appearance to the Tambour cargo deck 108. In fundamental embodiments, since the tambour cargo deck 108 is intended to support the weight of cargo the present disclosure contemplates that the ribs 124 be comprised of a material suitable to support a maximum load weight that would be specified by the manufacturer for each individual vehicle employing the teachings of the present disclosure. In some embodiments, the ribs 124 comprise a high-strain composite material. Non-limiting examples include fiber-reinforced polymers, glass-reinforced plastics, metal matrix composites or ceramic matrix composites. In other embodiments, the ribs 124 comprise a metal material (e.g., aluminum titanium or steel) or metal alloy material. To maintain strengths while reducing weight, exemplary embodiments of the present disclosure utilize a honeycomb structure for the ribs 124. Non-limiting examples include a hexagon honeycomb pattern (800 in FIG. 8A), a square honeycomb pattern (802 in FIG. 8B) and a triangular honeycomb pattern (804 in FIG. 8C). It will be appreciated that other honeycomb patterns could be used in any particular implementation. The scrim 126 is also responsible for supporting the weight of the cargo placed on the tambour cargo deck 108. Accordingly, fundamental embodiments of the present disclosure contemplate a high strength material such as a para-aramid synthetic fiber (e.g., KEVLAR™ OR TWARON™) although other materials could be used depending upon the weight supporting specifications of any particular manufacturer. As noted above, tambour cargo deck 108 includes a handle 110 which may be fabric, plastic or nylon as desired any particular implementation. The handle 110 facilitates movement of the tambour cargo deck 108 through the track system as will be described below in connection with the method of FIG. 9.

Figure 9:
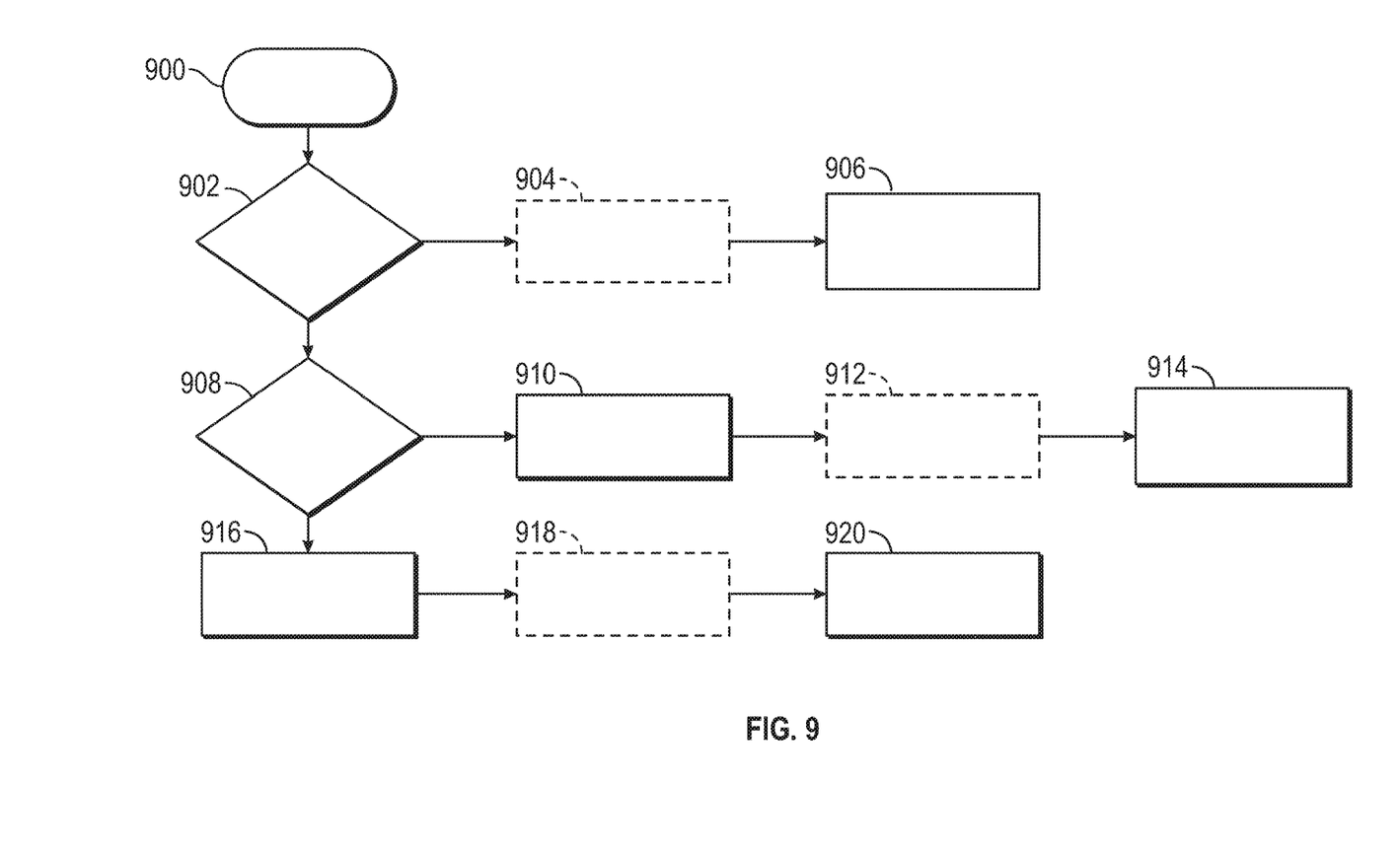
FIG. 9 is a flow diagram illustrating a method in accordance with an embodiment.

FIG. 9 illustrates a method 900 performed by an operator in accordance with exemplary embodiments of the present disclosure. In block 902, it is determined whether the tambour cargo deck 108 is in the third (stored) cargo floor position. An affirmative determination provides access to the spare tire in block 904 for those embodiments were spare tire is stored below the cargo area of the vehicle. From the third (stored) cargo floor position, an operator may move the tambour cargo deck along the track system 112 to the first (114) or second (116) cargo floor position as desired as shown in block 906.

Figure 1:
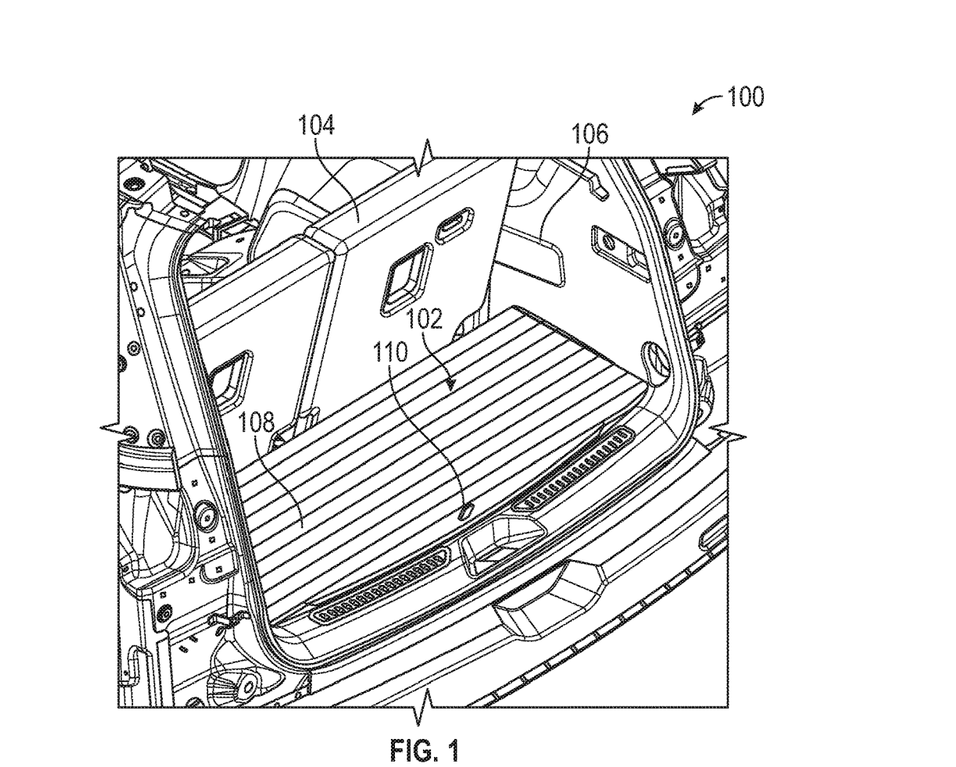
FIG. 1 is a rear perspective view illustrating the tambour cargo deck in a first (upper) cargo floor position in accordance with an embodiment.
Figure 2:
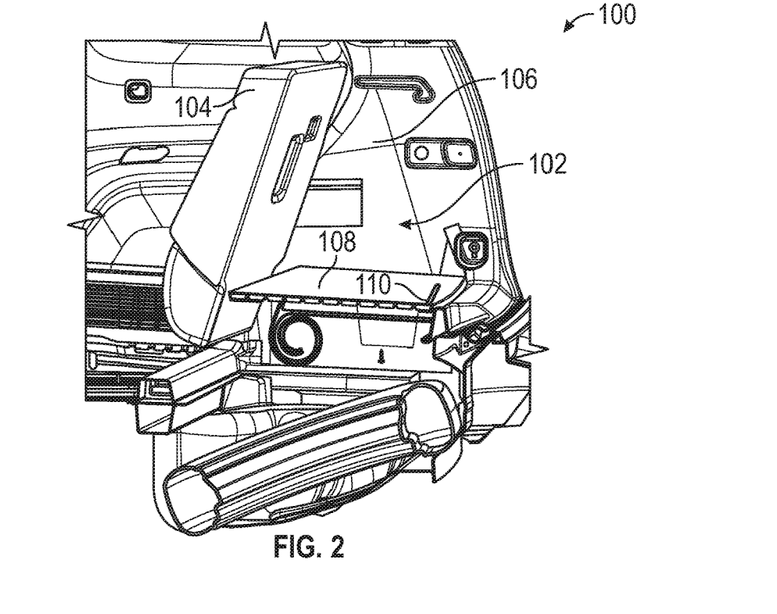
FIG. 2 is a side cutaway view illustrating the tambour cargo deck in a first (upper) cargo floor position in accordance with an embodiment.
Figure 3:
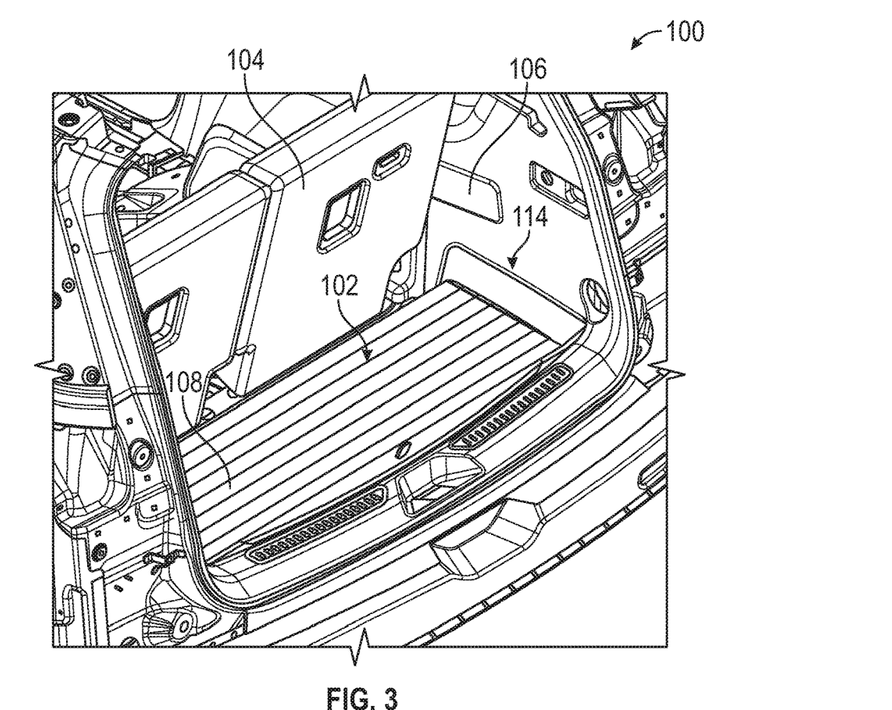
FIG. 3 is a rear perspective view illustrating the tambour cargo deck in a second (lower) cargo floor position in accordance with an embodiment.
Figure 4:
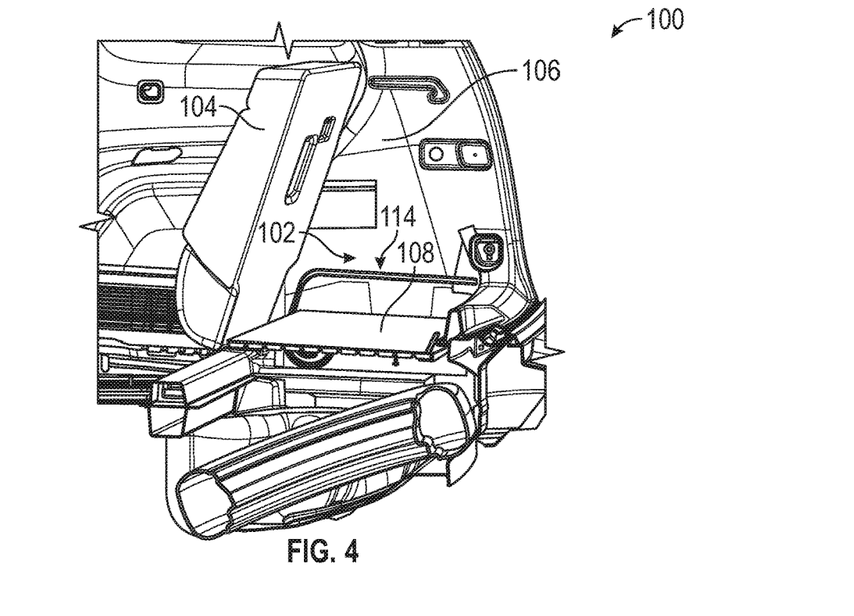
FIG. 4 is a side cutaway view illustrating the tambour cargo deck in a second (lower) cargo floor position in accordance with an embodiment.

If the determination of block 902 that the tambour cargo deck 108 is not in the third (stored) cargo floor position, then block 908 determines whether the tambour cargo deck 108 is in the first (upper) cargo floor position (illustrated in FIGS. 1-2). If so, the operator may move the tambour cargo deck 108 via the track system 112 to the third (stored) cargo floor position in block 910 which optionally (depending upon the particular implementation) will provide access to the spare tire 122. From the third (stored) cargo floor position, the operator may then move the tambour cargo deck 108 via the track system 112 into the second (lower) cargo for position 116 to increase the volume of the cargo area 102 of the vehicle 100.

Conversely, a negative determination of block 908 means that the tambour cargo deck is currently positioned in the second (lower) cargo floor position and the operator would move the tambour cargo deck 108 to the third (stored) cargo floor position in block 916 via the track system 112. As noted above, this optionally provides access to the spare tire 122 in block 918 for those embodiments storing a spare tire 122 for the vehicle 100 below the cargo area 102. From the third (stored) cargo floor position, the operator would move the tambour cargo deck 108 along the track system 112 to the first (upper) cargo floor position 114 if desired.

While at least one exemplary aspect has been presented in the foregoing detailed description of the disclosure, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing an exemplary aspect of the disclosure. It being understood that various changes may be made in the function and arrangement of elements described in an exemplary aspect without departing from the scope of the disclosure as set forth in the appended claims.

What is claimed is:

1. A vehicle having a cargo area, comprising:
   interior panels positioned within the cargo area, the interior panels including a track system having a first track portion defining a first cargo floor position, a second track portion defining a second cargo floor position and a third track portion defining a third cargo floor position; and
   a tambour cargo deck supported by the track system, and slidably movable from the first or second cargo floor position to the third cargo floor position, and slidably movable from the third argo floor position to the first or second cargo floor position.

2. The vehicle of claim 1, wherein a spare tire for the vehicle is accessible when the tambour cargo deck is in the third cargo floor position.

3. The vehicle of claim 1, wherein the tambour cargo deck comprises a plurality of ribs supported by a scrim.

4. The vehicle of claim 3, wherein the plurality of ribs comprise a composite material.

5. The vehicle of claim 4, wherein the composite material is a para-aramid synthetic fiber.

6. The vehicle of claim 3, wherein the plurality of ribs comprise a metal material.

7. The vehicle of claim 6, wherein the metal material comprises on of the group of metals: aluminum, titanium, steel or an alloy thereof.

8. The vehicle of claim 1, wherein the tambour cargo deck further comprises a handle for facilitating movement of the tambour cargo deck along the track system.

9. The vehicle of claim 1, wherein the cargo area of the vehicle is increased when the tambour cargo deck is moved from the first cargo floor storage position to the second cargo floor storage position.

* * * * *